US009352643B2

(12) United States Patent
Yone et al.

(10) Patent No.: US 9,352,643 B2
(45) Date of Patent: May 31, 2016

(54) CONTROL APPARATUS FOR CONTROLLING ACTIVE VIBROISOLATING SUPPORT DEVICE

(71) Applicant: HONDA MOTOR CO., LTD., Minato-ku, Tokyo (JP)

(72) Inventors: Tatsuhiro Yone, Utsunomiya (JP); Takashi Yamaguchi, Tochigi-ken (JP); Atsushi Mitsui, Sakura (JP); Kentaro Yamanaka, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 14/154,287

(22) Filed: Jan. 14, 2014

(65) Prior Publication Data
US 2014/0200764 A1 Jul. 17, 2014

(30) Foreign Application Priority Data

Jan. 16, 2013 (JP) .................. 2013-005706

(51) Int. Cl.
B60K 5/12 (2006.01)
F16F 15/00 (2006.01)

(52) U.S. Cl.
CPC .. B60K 5/12 (2013.01); F16F 15/00 (2013.01)

(58) Field of Classification Search
CPC ......... F16F 13/26; F16F 13/264; F16F 15/02;
F16F 13/268; F16F 15/002; F16F 15/03;
F16F 15/027; F16F 13/10; F16F 13/105;
B60W 10/08; B60W 20/00; B60W 2710/083;
B60W 10/06; B60W 10/26; B60W 2510/0638;
B60W 2540/10; B60W 2710/0666; F02D
35/024; F02D 41/005; F02D 41/042; F02D
41/062; F02D 41/187; F02D 41/3035; F02D
41/3058; F02D 41/345
USPC ................... 701/1, 111, 36, 102, 104, 22, 83;
123/399, 64, 704, 90.16, 406.19
See application file for complete search history.

(56) References Cited

U.S. PATENT DOCUMENTS 5,154,403 A * 10/1992 Sato ........................... 267/141.2
2005/0017420 A1* 1/2005 Nemoto et al. ........... 267/140.14
2006/0156536 A1* 7/2006 Nemoto ........................ 29/602.1

(Continued)

FOREIGN PATENT DOCUMENTS

DE 10 2010 035 477 A1 5/2011
DE 11 2010 001 470 T5 6/2012

(Continued)

OTHER PUBLICATIONS

German Search Report dated Mar. 5, 2014 issued over the corresponding DE Patent Application No. 102014200630.9 with English translation thereof.

(Continued)

Primary Examiner — Truc M Do
(74) Attorney, Agent, or Firm — Carrier Blackman & Associates, P.C.; Joseph P. Carrier; Jeffrey T. Gedeon

(57) ABSTRACT

A control apparatus includes an actuator ECU for controlling a plurality of ACMs. When an engine is started or restarted, the actuator ECU begins a vibration suppressing control process with the ACMs for suppressing vibrations transmitted to a vehicle body when a crankshaft angle, which is represented by a CRK pulse signal from a CRK sensor, reaches a beginning crankshaft angle.

7 Claims, 10 Drawing Sheets

(56) References Cited

U.S. PATENT DOCUMENTS

| | | | |
|---|---|---|---|
| 2007/0001354 A1* | 1/2007 | Stothers et al. | 267/136 |
| 2009/0039577 A1* | 2/2009 | Ishiguro et al. | 267/140.13 |
| 2009/0045560 A1* | 2/2009 | Fueki et al. | 267/140.15 |
| 2010/0244341 A1* | 9/2010 | Nemoto | F16F 13/02 267/140.14 |
| 2010/0246086 A1* | 9/2010 | Ishiguro et al. | 361/160 |
| 2011/0053733 A1 | 3/2011 | Swales et al. | |
| 2012/0013057 A1 | 1/2012 | Nemoto | |

FOREIGN PATENT DOCUMENTS

| | | | |
|---|---|---|---|
| JP | 2005-320945 A | 11/2005 | |
| JP | 2006017288 A | 1/2006 | |
| JP | 2007107579 A | 4/2007 | |
| JP | 2010-230135 A | 10/2010 | |
| JP | 2011-252553 A | 12/2011 | |

OTHER PUBLICATIONS

Office Action and Search Report dated Jul. 13, 2015 issued over the corresponding Chinese Patent Application No. 201410014257.2 with the English translation of pertinent portion.

\* cited by examiner

CONTROL APPARATUS FOR CONTROLLING ACTIVE VIBROISOLATING SUPPORT DEVICE

CROSS-REFERENCE TO RELATED APPLICATION

This application is based upon and claims the benefit of priority from Japanese Patent Application No. 2013-005706 filed on Jan. 16, 2013, the contents of which are incorporated herein by reference.

BACKGROUND OF THE INVENTION

1. Field of the Invention

The present invention relates to a control apparatus for controlling an active vibroisolating support device, which suppresses vibrations transmitted from an engine to a vehicle body by energizing an actuator.

2. Description of the Related Art

Japanese Laid-Open Patent Publication No. 2011-252553 (hereinafter referred to as "JP2011-252553A") discloses a technology for suppressing vibrations transmitted from an engine to a vehicle body by energizing an actuator. More specifically, JP2011-252553A reveals an active vibroisolating support device that suppresses vibrations of a vehicle body caused by rolling natural vibrations of an engine, which are generated during a motoring period of the engine ranging from a time when the engine starts to be cranked to a time when the engine is fired for the first time. JP2011-252553A also discloses a control apparatus for controlling the active vibroisolating support device.

SUMMARY OF THE INVENTION

According to the technology disclosed in JP2011-252553A, in order to suppress vibrations of the vehicle body caused by rolling natural vibrations, a standard vibration beginning time, which is represented by an average of a plurality of rolling natural vibration beginning times, is multiplied by a corrective coefficient depending on the crankshaft angle at a time that operation of the engine is stopped, thereby calculating or correcting the rolling natural vibration beginning time. Thereafter, a vibration suppressing control process is carried out based on the corrected rolling natural vibration beginning time.

According to JP2011-252553A, furthermore, rotational speeds of the engine (engine rotational speeds), which are calculated from crankshaft angles, are mapped to vibration beginning times. According to JP2011-252553A, therefore, based on the vibration beginning time, it is detected whether or not an engine rotational speed has reached a rotational speed depending on rolling natural vibrations. If the engine rotational speed exceeds the rotational speed at the vibration beginning time, then it is judged that the engine has begun producing rolling natural vibrations.

However, as shown in FIG. 6 of the accompanying drawings, the gradient of an increase over time of the engine rotational speed, i.e., the engine rotational acceleration, varies with different starting torques and with different types of engine starters, e.g., a hybrid vehicle motor and a starter motor.

When the vibration suppressing control process is initiated based on the engine rotational speed, the calculated vibration beginning time and the actual time at which rolling natural vibrations occur tend to deviate from each other. Therefore, the vibration suppressing control process is likely to be initiated after the rolling natural vibrations have been generated. As a result, the vibration suppressing control process cannot be carried out in phase with rolling natural vibrations that are generated when the engine is started or restarted, thereby making it difficult to effectively suppress vibrations caused by the rolling natural vibrations and which are transmitted from the engine to the vehicle body.

An object of the present invention is to provide a control apparatus for controlling an active vibroisolating support device in order to effectively suppress vibrations caused by rolling natural vibrations and which are transmitted from an engine to a vehicle body, by controlling actuators to perform a vibration suppressing control process on the engine in a timely fashion.

The present invention is concerned with a control apparatus for controlling an active vibroisolating support device, which is mounted on a vehicle body and supports an engine, and which suppresses vibrations transmitted from the engine to the vehicle body by energizing an actuator.

To achieve the above object, the present invention may have any one of the following arrangements [1] through [7].

[1] The control apparatus referred to above includes a crankshaft rotational position acquiring unit configured to acquire a rotational position of a crankshaft that is rotatable in the engine, and a control unit configured to energize the actuator to start a vibration suppressing control process of suppressing vibrations transmitted from the engine to the vehicle body when the rotational position of the crankshaft, which is acquired by the crankshaft rotational position acquiring unit, reaches a predetermined rotational position at a time that the engine is started or restarted.

Since the rotational position of the crankshaft represents physical positional information, it is less likely to vary even if the engine is started by different types of engine starters. Also, the rotational position of the crankshaft is less liable to deviate from the time at which the engine produces rolling natural vibrations (rolling resonance).

The vibration suppressing control process is performed based on the rotational position of the crankshaft, rather than being based on the engine rotational speed (engine rotational speed, vibration beginning time) that has been a basis for the vibration suppressing control process according to the related art. Consequently, the timing accuracy of the vibration suppressing control process is increased. More specifically, according to the present invention, since the vibration suppressing control process is performed based on the rotational position of the crankshaft, which represents physical positional information, even though the gradient of an increase over time of the engine rotational speed varies with different types of engine starters, the timing of the vibration suppressing control process is prevented from varying.

According to the present invention, since the vibration suppressing control process for suppressing vibrations from the engine with the actuator is carried out in a timely fashion based on the rotational angle of the crankshaft, vibrations caused by rolling natural vibrations and which are transmitted from the engine to the vehicle body are effectively suppressed.

The predetermined rotational position preferably is a rotational position of the crankshaft at which rolling natural vibrations are produced, for example. If the vibration suppressing control process by the actuator is started from the rotational position at which rolling natural vibrations are produced, it is possible to efficiently suppress vibrations that are caused by rolling natural vibrations and which are transmitted from the engine to the vehicle body. According to the present embodiment, since the vibration suppressing control process by the actuator may begin prior to generation of such rolling natural vibrations, any desired rotational position of the crankshaft that occurs before the rolling natural vibrations are produced may be established as the predetermined rotational position.

[2] The control unit acquires a rotational position of the crankshaft from the crankshaft rotational position acquiring unit in a stopped state of the engine, and establishes the predetermined rotational position based on the acquired rotational position of the crankshaft in the stopped state of the engine.

If the engine stops operating at different crankshaft angles, rolling natural vibrations are produced at different times when the engine is started or restarted. According to the present invention, since the predetermined rotational position is established based on the rotational position of the crankshaft when the engine stops operating, the timing accuracy of the vibration suppressing control process is increased, regardless of different rotational positions of the crankshaft at which the engine stops operating.

[3] The actuator is periodically expanded and contracted based on a current supplied from the control unit depending on a state of the engine, for thereby vibrating a vibrating plate fixed to the actuator in order to suppress vibrations transmitted from the engine to the vehicle body. The control unit supplies a predetermined direct current to the actuator, so as to move the vibrating plate to a predetermined position when the engine is started or restarted. The control unit supplies the current depending on the state of the engine to the actuator, so as to enable the actuator to start the vibration suppressing control process when the rotational position of the crankshaft reaches the predetermined rotational position.

With such an arrangement, using reaction forces generated under the elasticity of the vibrating plate, the active vibroisolating support device can produce desired forces from the drive currents supplied in an initial phase of operation of the active vibroisolating support device. As a result, the vibration suppressing control process is performed effectively from the initial phase of operation of the active vibroisolating support device.

[4] The control apparatus further comprises a memory unit configured to store the rotational position of the crankshaft acquired by the crankshaft rotational position acquiring unit. The control unit acquires the rotational position of the crankshaft from the memory unit, and updates the acquired rotational position of the crankshaft during a period after the engine has stopped operating until the engine is started or restarted.

With such an arrangement, even if the crankshaft rotates when the engine has stopped, an accurate rotational position of the crankshaft immediately before the engine is started or restarted can be grasped. Therefore, the timing accuracy of the vibration suppressing control process is increased.

[5] The control apparatus further comprises a top-dead-center detecting unit configured to detect positional information of a piston disposed in the engine with respect to a top dead center position thereof. The control unit acquires a rotational position of the crankshaft in a stopped state of the engine from the crankshaft rotational position acquiring unit, and corrects information of the acquired rotational position of the crankshaft in the stopped state of the engine based on the positional information of the piston, which is detected by the top-dead-center detecting unit.

With such an arrangement, even if the rotational position of the crankshaft in the stopped state of the engine varies slightly, the control unit can correct such a variation based on the positional information of the piston, so as to acquire an accurate rotational position of the crankshaft. Thus, the timing of the vibration suppressing control process is established accurately when the engine is started or restarted.

[6] Instead of the details described above in arrangements [1] through [5], the control apparatus may include a piston position acquiring unit configured to acquire a position of a piston disposed in the engine, and a control unit configured to energize the actuator to start a vibration suppressing control process of suppressing vibrations transmitted from the engine to the vehicle body when the position of the piston, which is acquired by the piston position acquiring unit, reaches a predetermined position at a time that the engine is started or restarted.

Similar to the rotational position of the crankshaft, the position of the piston represents physical positional information. Even though the gradient of an increase over time of the engine rotational speed varies with different types of engine starters, based on the position of the piston, which is representative of physical positional information, the timing of the vibration suppressing control process is prevented from varying, regardless of different types of engine starters that are used when the vibration suppressing control process is performed. Thus, since the vibration suppressing control process is less liable to deviate in timing from the rolling natural vibrations, the timing accuracy of the vibration suppressing control process is increased compared with the timing accuracy of the conventional vibration suppressing control process, which is performed based on engine rotational speed (engine rotational speed, vibration beginning time).

The predetermined rotational position preferably is a position of the piston at which rolling natural vibrations are produced, for example. When the vibration suppressing control process by the actuator starts from the position of the piston at which rolling natural vibrations are produced, it is possible to effectively suppress vibrations that are caused by rolling natural vibrations and which are transmitted from the engine to the vehicle body.

[7] The control apparatus described in arrangement [6] further comprises a top-dead-center detecting unit configured to detect positional information of the piston with respect to a top dead center position thereof. The control unit judges whether the piston moves from the top dead center position to a bottom dead center position, or from the bottom dead center position to the top dead center position, based on the positional information of the piston, which is acquired by the top-dead-center detecting unit.

When the crankshaft undergoes one revolution, the piston moves back and forth in one cycle. Therefore, during one revolution of the crankshaft, the piston reaches the same single position twice. For performing the vibration suppressing control process reliably, therefore, positional information of the piston is detected by the top-dead-center detecting unit, so as to judge whether or not the piston has moved from the top dead center position to the bottom dead center position, or from the bottom dead center position to the top dead center position, for thereby accurately judging the position of the piston.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

[Overall Configuration of Control Apparatus (Vehicle Control Apparatus) for Controlling an Active Vibroisolating Support Device]

Figure 1:
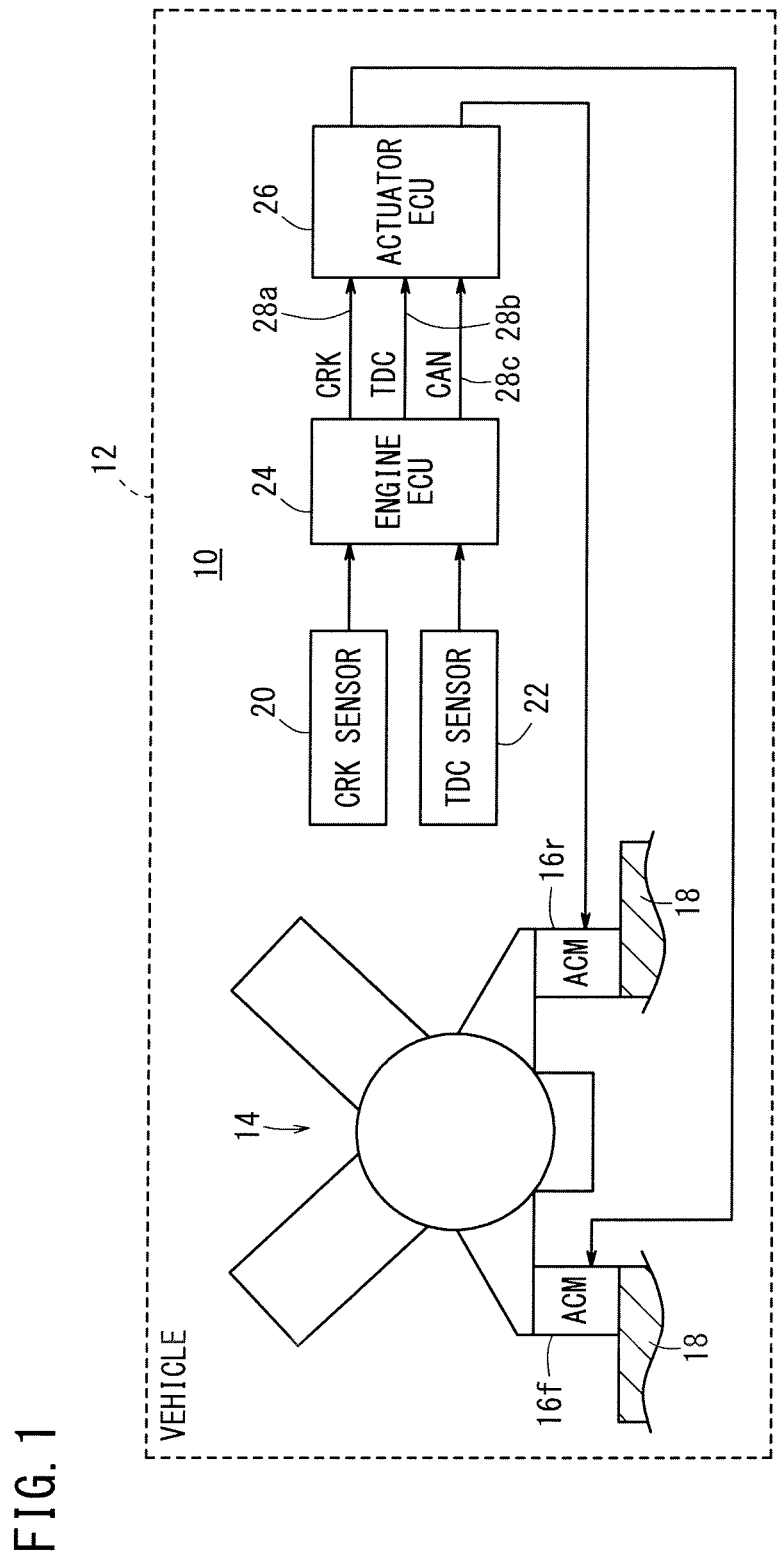
FIG. 1 is a schematic view, partially in block form, of a control apparatus for controlling an active vibroisolating support device according to an embodiment of the present invention.

As shown in FIG. 1, a control apparatus 10 for controlling an active vibroisolating support device according to an embodiment of the present invention constitutes one type of vehicle control apparatus that is applied to a vehicle 12. The control apparatus 10 performs a vibration suppressing control process for energizing active control mounts 16f, 16r (hereinafter referred to as "ACMs 16f, 16r"), which function as active vibroisolating support devices that suppress vibrations transmitted from a multi-cylinder engine 14 to a vehicle body 18.

The control apparatus 10 is used, for example, to suppress vibrations of the vehicle body 18 that are caused by rolling natural vibrations (rolling resonance), which are generated in the engine 14 during a motoring period of the engine 14. The motoring period refers to a period from a time at which the engine 14 is started or restarted to a time at which the engine 14 is fired for the first time.

The ACMs 16f, 16r, which are disposed on front and rear ends of the engine 14, are capable of periodically expanding and contracting along vertical directions. The ACMs 16f, 16r elastically support the engine 14 on a frame of the vehicle body 18. Starting of the engine 14 can be defined, for example, as bringing the engine 14 into operation from a stopped state in response to an action taken by the driver of the vehicle 12. Restarting of the engine 14 can be defined, for example, as automatically stopping the engine 14 on a part of the vehicle 12, and then automatically bringing the engine 14 into operation again from the stopped state. However, starting and restarting of the engine 14 are not limited to the above definitions, and the engine 14 may be started or restarted according to other processes.

The control apparatus 10 includes a crankshaft pulse sensor 20 (crankshaft rotational position acquiring unit, crankshaft position acquiring unit), a top-dead-center sensor 22 (piston position acquiring unit, top-dead-center detecting unit, cam signal acquiring unit), an engine ECU 24 (engine control unit), and an actuator ECU 26 (actuator control unit, correcting unit).

The crankshaft pulse sensor 20 (hereinafter referred to as a "CRK sensor 20") supplies a crankshaft signal (hereinafter referred to as a "CRK pulse signal") to the engine ECU 24. The CRK pulse signal is made up from a series of pulses spaced at predetermined angular intervals, which are generated as the crankshaft of the engine 14 rotates. More specifically, the CRK sensor 20 comprises a rotor fixedly mounted on the crankshaft, and a magnetic detector disposed in facing relation to an outer circumferential surface of the rotor. The rotor has a plurality of gear teeth on the outer circumferential surface thereof. The gear teeth on the rotor are spaced at predetermined angular intervals, and the outer circumferential surface includes an area that is free of gear teeth (gear-teeth-free area). The magnetic detector comprises a plurality of magnetoresistive elements (MREs) and a biasing magnet.

As the rotor rotates with the crankshaft, the magnetic detector of the CRK sensor 20 detects the gear teeth as pulses, which are spaced at the above angular intervals, and detects the gear-teeth-free area as a substantially 0 level. Therefore, the CRK sensor 20 is capable of producing the aforementioned CRK pulse signal at respective rotational positions of the crankshaft, except for the position corresponding to the 0 level. The engine ECU 24 can grasp the rotational position (crankshaft angle) of the crankshaft by counting the number of pulses represented by the CRK pulse signal.

The top-dead-center sensor 22 (hereinafter referred to as a "TDC sensor 22") comprises a rotor, which is fixedly mounted on the camshaft of the engine 14, and a magnetic detector, which is disposed in facing relation to an outer circumferential surface of the rotor. The rotor has a plurality of long teeth, which have respective angles greater than the gear teeth of the CRK sensor 20, the angles being different from each other. As the camshaft rotates, the magnetic detector of the TDC sensor 22 detects the long teeth as pulses having pulse durations longer than the pulses of the CRK pulse signal, and supplies a TDC pulse signal, which is made up of the detected pulses, to the engine ECU 24.

The crankshaft undergoes two revolutions for each one revolution of the camshaft. The long teeth correspond to respective cylinders of the engine 14. Therefore, upon rotation of the camshaft, when a cylinder is in a combustion stroke, the pulses of the TDC pulse signal switch from one to another as the cylinders switch from one to another, and the pulses have different angles corresponding to the respective cylinders. Thus, the TDC sensor 22 generates a TDC pulse signal made up of pulses having different pulse durations that correspond to the respective cylinders. Consequently, by checking the TDC pulse signal supplied from the TDC sensor 22, the engine ECU 24 can grasp which one of the cylinders presently has the piston thereof reaching the top dead center during the combustion stroke.

Since each of the CRK sensor 20 and the TDC sensor 22 comprises a magnetic sensor comprising MREs, the CRK sensor 20 and the TDC sensor 22 are capable of detecting rotational positions of the crankshaft and the camshaft during rotation thereof even if the engine 14 has stopped. Details of the CRK sensor 20 and the TDC sensor 22 are disclosed in Japanese Laid-Open Patent Publication No. 2005-320945, for example. Therefore, the CRK sensor 20 and the TDC sensor 22 will not be described in detail below.

The engine ECU 24 controls the engine 14 based on the CRK pulse signal supplied from the CRK sensor 20 and the TDC pulse signal supplied from the TDC sensor 22. The engine ECU 24 sends the CRK pulse signal to the actuator ECU 26 through a CRK pulse signal line 28a, and sends the TDC pulse signal to the actuator ECU 26 through a TDC pulse signal line 28b. Furthermore, the engine ECU 24 sends various items of information to the actuator ECU 26 through a CAN (Controller Area Network) communication line 28c.

Based on the CRK pulse signal, the TDC pulse signal, and other various items of information, the actuator ECU 26 generates drive signals for energizing the ACMs 16f, 16r, converts the generated drive signals into drive currents, and supplies the drive currents to the ACMs 16f, 16r. Accordingly, the drive signals and the drive currents serve as control signals and currents, respectively, which are generated depending on the operational state of the engine 14 represented by the CRK pulse signal and the TDC pulse signal. When the drive currents are supplied to the ACMs 16f, 16r, the ACMs 16f, 16r periodically expand and contract in vertical directions depending on the supplied drive currents, thereby suppressing vibrations of the vehicle body 18.

[Structure of ACMs]

Figure 2:
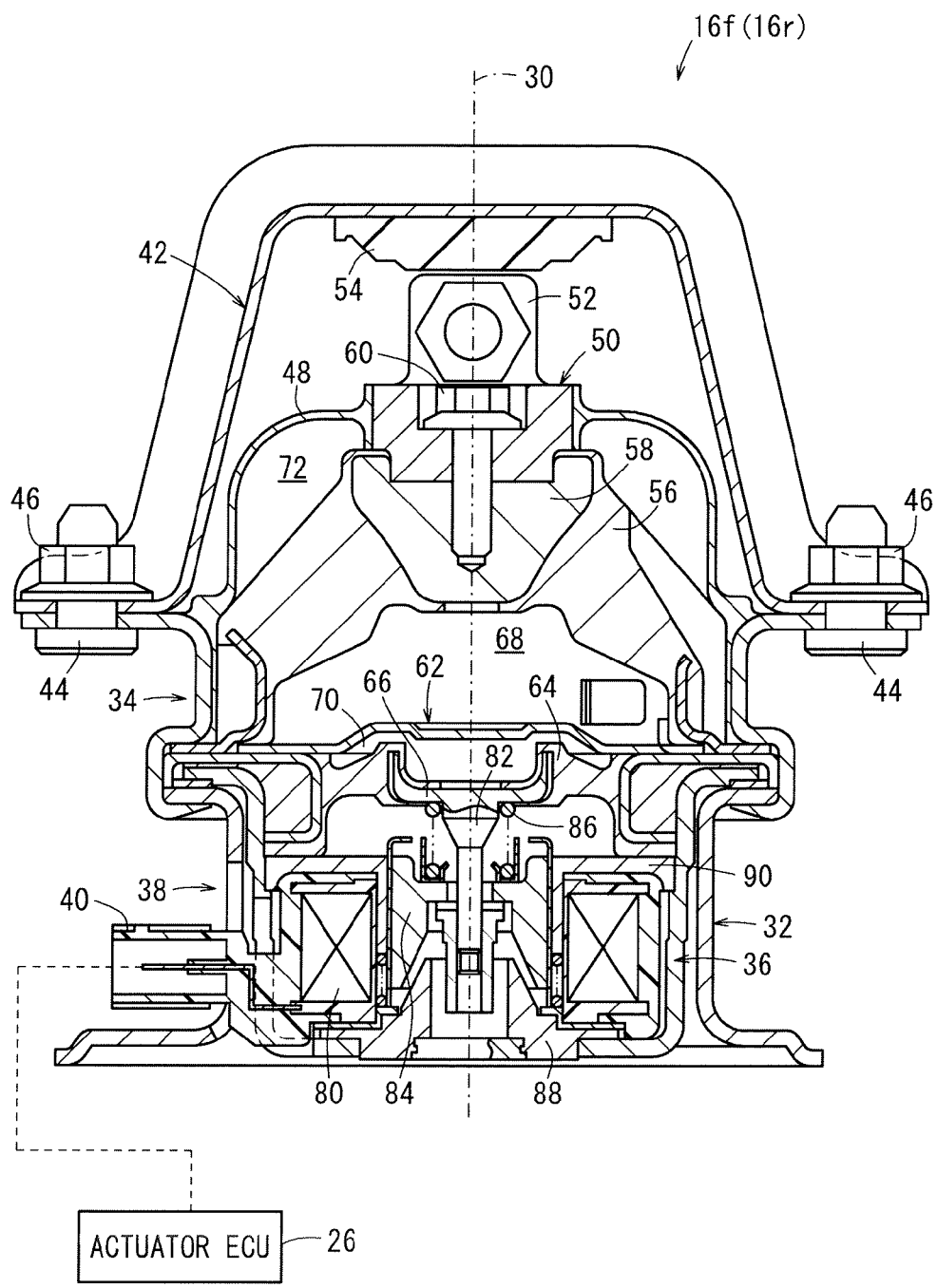
FIG. 2 is a cross-sectional view of an ACM (Active Control Mount) shown in FIG. 1.

As shown in FIG. 2, each of the ACMs 16f, 16r is formed with an axisymmetric structure with respect to an axial line 30. The ACMs 16f, 16r essentially are of the same structure as the ACMs disclosed in JP2011-252553A and in Japanese Laid-Open Patent Publication No. 2010-230135, for example.

Each of the ACMs 16f, 16r has a substantially tubular lower housing 32, and a substantially tubular upper housing 34 that engages with the lower housing 32. The lower housing 32 and the upper housing 34 accommodate therein an upwardly open, substantially cup-shaped actuator case 36. The actuator case 36 houses therein an actuator 38, which is energizable by a drive signal supplied from the actuator ECU 26 through a connector 40.

The upper housing 34 is closed by a stopper 42 on an upper end thereof. The upper housing 34 and the stopper 42 are fastened to each other by bolts 44 and nuts 46. The lower housing 32, the upper housing 34, and the stopper 42 jointly define a closed inner space, which accommodates therein a diaphragm 48 having an outer edge region joined by vulcanization bonding to an inner circumferential surface of the upper housing 34. A diaphragm support boss 50 is disposed centrally on the diaphragm 48, and an engine mount 52, which is fixed to the engine 14, is integrally joined to an upper surface of the diaphragm support boss 50. The stopper 42 includes a rubber stopper 54 disposed in confronting relation to the engine mount 52 for abutment against the engine mount 52.

The diaphragm 48 is disposed above a first elastic body 56 having a recess defined in an upper surface thereof, and receiving a first elastic body support boss 58 in the recess. A diaphragm support boss 50 is fastened to the first elastic body support boss 58 by a bolt 60.

The first elastic body 56 is disposed above a disk-shaped partition 62 having an outer circumferential portion, which is joined to the actuator case 36 by a second elastic body 64 in the form of a rubber diaphragm. The second elastic body 64 is joined between the outer circumferential portion and the actuator case 36 by vulcanization bonding. A movable member 66 (vibrating plate) is embedded centrally in the second elastic body 64 by vulcanization bonding.

The first elastic body 56 and the partition 62 jointly define therebetween a first liquid chamber 68 that is filled with a liquid. The partition 62 and the second elastic body 64 jointly define therebetween a second liquid chamber 70 that is filled with a liquid. The first elastic body 56 and the diaphragm 48 jointly define therebetween a third liquid chamber 72 that is filled with a liquid.

The actuator 38 comprises a coil 80, a substantially cylindrical rod 82 coupled to the movable member 66 and which is vertically movably disposed in the coil 80, a substantially tubular movable core 84 coupled to an outer circumferential surface of the rod 82, a spring 86 that normally urges the movable core 84 in a downward direction, a fixed core 88 disposed below the movable core 84 in axially confronting relation thereto, and a yoke 90 disposed radially outward of the movable core 84 and which extends over the coil 80.

When the vehicle body 18 vibrates due to rolling natural vibrations of the engine 14 during a motoring period in which the engine 14 is motored, the vibrations impose loads from the engine 14 to the vehicle body 18 and vice versa. During a period of time in which a downward load (hereinafter referred to as a "pushing load") is applied from the engine 14 to the vehicle body 18, the pushing load is transmitted from the engine 14 to the diaphragm support boss 50 and the first elastic body support boss 58, thereby elastically deforming the first elastic body 56 and reducing the volume of the first liquid chamber 68, i.e., compressing the liquid in the first liquid chamber 68. During a period of time in which an upward load (hereinafter referred to as a "pulling load") is applied to the vehicle body 18 in a direction from the vehicle body 18 to the engine 14, the pulling load elastically deforms the first elastic body 56, so as to increase the volume of the first liquid chamber 68.

The actuator ECU 26 supplies a drive current, which is based on the CRK pulse signal and the TDC pulse signal during the motoring period, to the coil 80 through the connector 40. The coil 80 is energized to attract the movable core 84 toward the fixed core 88, thereby moving the rod 82 and the movable member 66 downwardly. Downward movement of the movable member 66 elastically deforms the second elastic body 64 in a downward direction, thereby increasing the volume of the second liquid chamber 70.

The first liquid chamber 68 and the second liquid chamber 70 are held in fluid communication with each other through a communication hole defined in the partition 62. Therefore, when the volume of the second liquid chamber 70 is increased, the liquid in the first liquid chamber 68, which is compressed under the pushing load from the engine 14, flows through the communication hole in the partition 62 and into the second liquid chamber 70. As a result, the pushing load transmitted from the engine 14 to the vehicle body 18 is reduced.

When the drive current, which is supplied to the coil 80 from the actuator ECU 26, is reduced, the movable core 84, which has been elastically deformed downwardly, is released from the downward attracting force, and moves back to the upper position under the elasticity thereof. The rod 82, which is coupled to the movable core 84 and also to the movable member 66 embedded in the second elastic body 64, is pulled upwardly and moved, so as to elastically displace the second elastic body 64 in an upward direction. Consequently, the volume of the second liquid chamber 70 is reduced, thereby forcing the liquid contained therein to flow through the communication hole in the partition 62 and into the second elastic body 64, which has been depressurized under the pulling load from the engine 14. As a result, the pulling load by the engine 14 on the vehicle body 18 is reduced.

Therefore, when vibrations are produced in the vehicle body 18 during the motoring period, which repetitively apply pushing and pulling loads due to rolling natural vibrations of the engine 14, the actuator ECU 26 supplies the coil 80 of each of the ACMs 16f, 16r with a drive current made up of periodic pulses. The drive current acts to periodically move the movable member 66 vertically, thereby suppressing the vibrations of the vehicle body 18.

[Configuration of Engine ECU]

Figure 3:
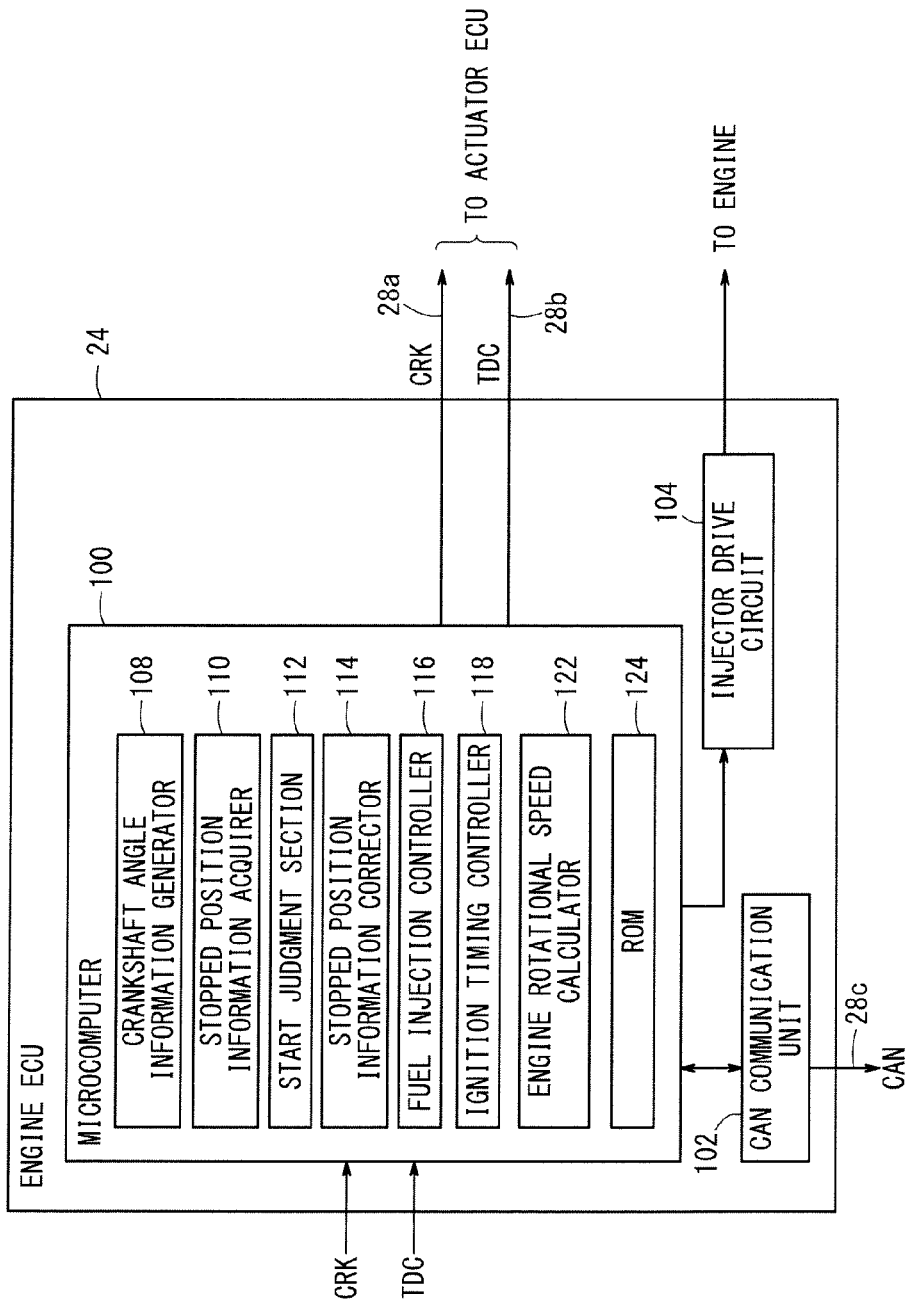
FIG. 3 is a block diagram of an engine ECU (Electronic Control Unit) shown in FIG. 1.

As shown in FIG. 3, the engine ECU 24, which serves to control the engine 14, has a microcomputer 100, a CAN communication unit 102, and an injector drive circuit 104.

In addition to a ROM 124 (memory unit), the microcomputer 100 includes a crankshaft angle information generator 108, a stopped position information acquirer 110, a start judgment section 112, a stopped position information corrector 114, a fuel injection controller 116, an ignition timing controller 118, and an engine rotational speed calculator 122, which are implemented as software functions.

The crankshaft angle information generator 108 counts pulses of the CRK pulse signal supplied to the microcomputer 100, calculates a rotational position (crankshaft angle) of the crankshaft from the counted pulses, and supplies the calculated crankshaft angle as crankshaft angle information. The engine rotational speed calculator 122 calculates an engine rotational speed based on the CRK pulse signal.

The start judgment section 112 monitors the engine rotational speed, which is calculated by the engine rotational speed calculator 122, and receives a signal from a non-illustrated ignition switch of the vehicle 12. If the engine rotational speed has increased from a substantially 0 level and/or a signal is supplied to the start judgment section 112 from the ignition switch, then the start judgment section 112 judges that the engine 14 is being started or restarted, and supplies the judgment result as start judgment information. The start judgment information is stored in the ROM 124, which comprises a nonvolatile memory such as an EEPROM or the like.

The stopped position information acquirer 110 monitors whether or not the engine 14 has stopped operating. If the engine 14 has stopped operating, the stopped position information acquirer 110 acquires crankshaft angle information from the crankshaft angle information generator 108. The stopped position information acquirer 110 identifies the crankshaft angle, which is indicated by the acquired crankshaft angle information, as a crankshaft angle (hereinafter referred to as a "stopped crankshaft angle") of the crankshaft of the engine 14, which is in a stopped condition, and supplies the identified stopped crankshaft angle together with information indicating that the engine 14 is presently in a stopped condition as stopped position information (crankshaft stopped position information). The stopped position information is stored in the ROM 124.

As described above, even if the engine 14 has stopped, the CRK sensor 20 generates a CRK pulse signal representing the rotational position of the crankshaft. Accordingly, the stopped position information acquirer 110 can acquire a stopped crankshaft angle each time that a predetermined time period has passed, and store the acquired stopped crankshaft angle in the ROM 124. Therefore, even if the crankshaft rotates while the engine 14 is in a stopped condition, the stopped crankshaft angle that is acquired can be updated. Consequently, the stopped position information acquirer 110 can acquire an accurate stopped crankshaft angle of the engine 14 by acquiring the crankshaft angle as a stopped crankshaft angle immediately before the engine 14 is started or restarted.

The stopped position information acquirer 110 judges whether or not the engine 14 has stopped in the following manner. The stopped position information acquirer 110 monitors the engine rotational speed calculated by the engine rotational speed calculator 122. If the monitored engine rotational speed is substantially 0, then the stopped position information acquirer 110 judges that the engine 14 has stopped. On the other hand, if the start judgment section 112 supplies start judgment information thereto, then the stopped position information acquirer 110 judges that starting or restarting of the engine 14 has begun, and terminates the aforementioned process of acquiring crankshaft angle information.

Because of a variation in accuracy that the CRK sensor 20 suffers from, the crankshaft angle calculated by the crankshaft angle information generator 108 and the actual crankshaft angle of the crankshaft differ from each other by ±several pulses in terms of the CRK pulse signal. When the actuator ECU 26 establishes a time to start controlling the ACMs 16f, 16r in synchronism with vibrations (rolling resonance) of the vehicle body 18, which are caused by rolling natural vibrations that are generated when the engine is started or restarted, it is necessary for the actuator ECU 26 to correct the crankshaft angle, and thereafter, to establish a time at which controlling of the ACMs 16f, 16r is started based on the corrected crankshaft angle.

According to the present embodiment, when the stopped position information corrector 114 detects a first change in the TDC pulse signal, i.e., an edge of a first TDC pulse, after the engine 14 has been started or restarted, the stopped position information corrector 114 detects positional information of the crankshaft depending on the pulse of the TDC pulse signal at the time of detection thereof, and regards the crankshaft angle represented by the detected positional information as an accurate angle. Since a crankshaft angle at the time that cylinders switch from one cylinder to another is determined uniquely, the stopped crankshaft angle can be corrected accurately using the uniquely determined crankshaft angle as a reference. The edge of the first TDC pulse may be a positive-going edge or a negative-going edge, insofar as the crankshaft angle can be acquired upon the occurrence of an edge.

Inasmuch as the ROM 124 stores stopped position information and start judgment information, the stopped position information corrector 114 back-calculates and acquires a pulse (crankshaft angle) of a CRK pulse signal at the time that the engine 14 is started or restarted, using an accurate crankshaft angle. As a result, it is possible to acquire an accurate stopped crankshaft angle at the time that the engine 14 is started or restarted.

When the engine 14 stops operating, the microcomputer 100 preferably stops controlling the engine 14 such that none of the pistons in any of the cylinders stops at a TDC (top dead center) position (by adjusting the output of a hybrid vehicle motor or a starter motor), i.e., the pistons will be stopped at positions other than the TDC position, and the camshaft will not stop at a rotational position at which a pulse edge of the TDC pulse signal is detected. In this manner, a pulse edge occurs within a short period of time after the engine 14 has been started or restarted, thereby making it possible to acquire the crankshaft angle quickly and accurately.

The fuel injection controller 116 sets an amount of fuel to be injected (fuel injection time) depending on the engine rotational speed, and controls the injectors of the operational cylinders so as to inject fuel into the cylinders based on a fuel injection start timing map, which is preset depending on the timings of the CRK pulse signal and the TDC pulse signal that were stored in the ROM 124.

When the engine 14 is started or restarted, the fuel injection controller 116 confirms that the rotational engine speed in the motoring period has reached a suitable ignition speed, based on a crankshaft angle from the stopped crankshaft angle at the time that the engine 14 has initiated starting or restarting (hereinafter referred to as a "starting crankshaft angle") and the engine rotational speed calculated by the engine rotational speed calculator 122. At the same time, based on the CRK pulse signal and the TDC pulse signal, the fuel injection controller 116 determines which cylinder is to be fired first, and performs a control process for controlling the injectors to inject fuel successively into the cylinders.

The ignition timing controller 118 establishes ignition timings for the respective cylinders based on an ignition timing map, which is preset depending on the crankshaft angle from the starting crankshaft angle and the engine rotational speed stored in the ROM 124.

Apart from the CRK pulse signal and the TDC pulse signal, the CAN communication unit 102 sends various items of information, e.g., the stopped position information and the starting judgment information, to the actuator ECU 26 through the CAN communication line 28c, and also receives various items of information from the actuator ECU 26 through the CAN communication line 28c.

The injector drive circuit 104 is controlled by the microcomputer 100 in order to control the injectors of the cylinders of the engine 14.

[Configuration of Actuator ECU]

Figure 4:
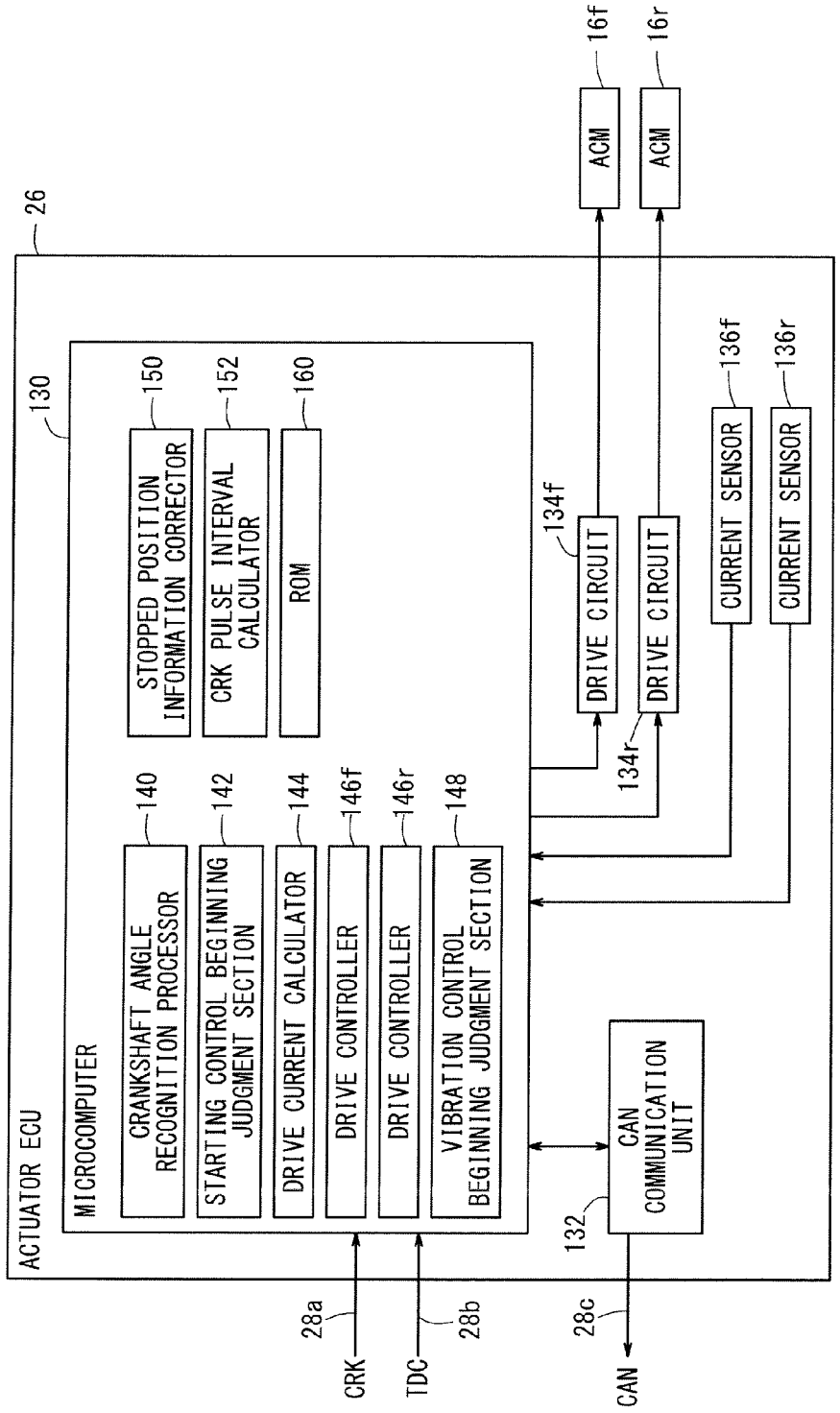
FIG. 4 is a block diagram of an actuator ECU (Actuator Control Unit) shown in FIG. 1.

As shown in FIG. 4, the actuator ECU 26 for controlling the ACMs 16f, 16r has a microcomputer 130, a CAN communication unit 132, drive circuits 134f, 134r, and current sensors 136f, 136r.

In addition to a ROM 160, the microcomputer 130 has a crankshaft angle recognition processor 140, a starting control beginning judgment section 142, a drive current calculator 144, drive controllers 146f, 146r, a vibration control beginning judgment section 148, a stopped position information corrector 150, and a CRK pulse interval calculator 152, which are implemented as software functions.

The starting control beginning judgment section 142 judges whether or not the engine 14 has been started or restarted based on the start judgment information sent from the engine 14 through the CAN communication line 28c and the CAN communication unit 132.

If the starting control beginning judgment section 142 judges that the engine 14 has been started or restarted, then the crankshaft angle recognition processor 140 identifies a stopped crankshaft angle, i.e., a starting crankshaft angle, at the time that the engine 14 is started or restarted, based on the stopped position information sent from the engine 14 through the CAN communication line 28c and the CAN communication unit 132. In other words, in order to identify the start time of the vibration suppressing control process, the crankshaft angle recognition processor 140 performs an initiation process for recognizing a crankshaft angle (starting crankshaft angle) that serves as a starting point of the vibration suppressing control process for suppressing vibrations of the vehicle body 18 due to rolling natural vibrations.

When the engine 14 is started or restarted at the identified starting crankshaft angle, the crankshaft angle at the start time of the rolling natural vibrations is determined uniquely in relation to the starting crankshaft angle. If the starting crankshaft angle is different, the crankshaft angle, which is determined uniquely in relation to the starting crankshaft angle, also is different. As a result, the timing at which the vibration suppressing control process is started for suppressing vibrations of the vehicle body 18 due to rolling natural vibrations also is different.

Using the identified starting crankshaft angle, the crankshaft angle recognition processor 140 calculates a crankshaft angle (hereinafter referred to as a "beginning crankshaft angle") for beginning the vibration suppressing control process that suppresses vibrations of the vehicle body 18 due to rolling natural vibrations. Information concerning the identified starting crankshaft angle and the calculated beginning crankshaft angle are stored in the ROM 160, which comprises a nonvolatile memory such as an EEPROM or the like.

Similar to the crankshaft angle information generator 108, the crankshaft angle recognition processor 140 may count pulses of the CRK pulse signal, which is supplied to the microcomputer 130, and calculate a crankshaft angle from the counted pulses.

The beginning crankshaft angle can be set to any desired crankshaft angle between the starting crankshaft angle and the crankshaft angle at which rolling natural vibrations are produced. Hereinbelow, the crankshaft angle recognition processor 140 will set the crankshaft angle at which rolling natural vibrations are produced as the beginning crankshaft angle.

When the crankshaft angle calculated by the crankshaft angle recognition processor 140 reaches the beginning crankshaft angle, the vibration control beginning judgment section 148 decides to begin controlling the ACMs 16f, 16r. In other words, the vibration control beginning judgment section 148 begins the vibration suppressing control process for suppressing vibrations of the vehicle body 18 using the beginning crankshaft angle as a trigger.

Similar to the stopped position information corrector 114, the stopped position information corrector 150 detects an edge of a first TDC pulse of the TDC pulse signal after the engine 14 has been started or restarted, corrects the stopped crankshaft angle (starting crankshaft angle) in the stopped position information, using as a reference the crankshaft angle indicated by a CRK pulse acquired at the detected edge, and stores new stopped position information including the corrected starting crankshaft angle in the ROM 160.

The CRK pulse interval calculator 152 calculates a pulse interval of the CRK pulse signal based on an internal clock signal of the microcomputer 130, together with the CRK pulse signal and the TDC pulse signal.

The drive current calculator 144 generates a target current waveform (command current waveform) for suppressing vibrations of the vehicle body 18 due to rolling natural vibrations of the engine 14, based on various items of information including the CRK pulse signal and the TDC pulse signal. For example, the drive current calculator 144 generates a command current waveform, which includes a direct current that flows during a period ranging from the starting crankshaft angle to the beginning crankshaft angle, and a repetitive pulsed current flowing after the beginning crankshaft angle.

The drive controllers 146f, 146r generate drive signals having PWM (Pulse Width Modulation) duty ratios depending on the command current waveform, and the generated drive signals are supplied to the drive circuits 134f, 134r. More specifically, the actuator ECU 26 performs a PWM control process for adjusting duty ratios of the drive signals, so as to make the drive currents supplied to the ACMs 16f, 16r closer to the command current waveform. The drive circuits 134f, 134r convert the drive signals supplied from the drive controllers 146f, 146r into drive currents, and supply the drive currents to the coils 80 of the ACMs 16f, 16r.

Consequently, the ACMs 16f, 16r move the movable members 66, etc., to predetermined positions during the period from the starting crankshaft angle to the beginning crankshaft angle. Thereafter, the ACMs 16f, 16r periodically move the movable members 66 vertically from the predetermined positions to positions that depend on the drive signals after the beginning crankshaft angle.

The current sensors 136f, 136r detect current values from the drive circuits 134f, 134r, and supply the detected current values to the microcomputer 130. Under a feedback control based on the supplied current values, the drive controllers 146f, 146r adjust the duty ratios of the drive signals, so as to make the drive signals closer to the command current waveform calculated by the drive current calculator 144, thereby changing the drive signals supplied to the drive circuits 134f, 134r.

[Vibration Suppressing Control Process of the Related Art and Problems Thereof]

The control apparatus 10, which is one type of vehicle control apparatus incorporated in the vehicle 12, is constructed as described above.

Prior to describing operations of the control apparatus 10, a vibration suppressing control process of the related art and problems thereof will be described below with reference to FIGS. 5 and 6. In the following description of the vibration suppressing control process of the related art, components thereof, which are identical to those of the control apparatus 10, will be referred to in combination with identical reference characters when necessary.

Figure 5:
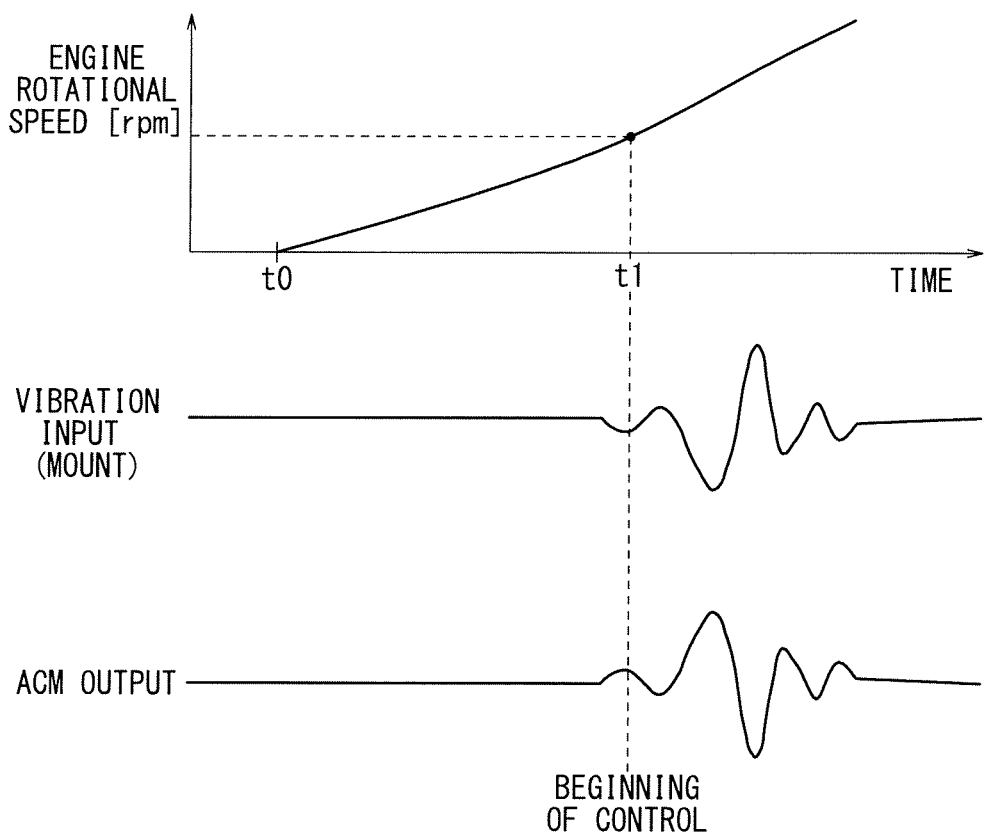
FIG. 5 is a timing chart showing by way of example a vibration suppressing control process according to the related art.

FIG. 5 is a timing chart showing by way of example a vibration suppressing control process according to the related art. FIG. 6 is a timing chart showing problems of the vibration suppressing control process according to the related art.

Heretofore, the engine 14 is started or restarted at time t0, and when the engine rotational speed reaches a predetermined engine rotational speed at time t1, the vibration suppressing control process is performed by the ACMs 16f, 16r in order to suppress vibrations of the vehicle body 18 due to rolling natural vibrations of the engine 14. As shown in FIG. 5, the ACMs 16f, 16r apply vibrational outputs such that the actuator 38 moves in inverted phase with the vibrations, i.e., the pushing load and the pulling load, that are applied from the engine 14 to the ACMs 16f, 16r. The vibrational outputs applied by the ACMs 16f, 16r are effective to reduce vibrations that are transmitted from the engine 14 to the vehicle body 18.

If the vehicle 12 is a vehicle such as an HEV (Hybrid Electric Vehicle) where the engine 14 is started by an electric motor, then the engine rotational speed may be converted based on a signal that is detected by an angle sensor (resolver) combined with the electric motor.

According to the vibration suppressing control process of the related art, as described above, the timing at which the vibration suppressing control process begins suppressing vibrations of the vehicle body 18 due to rolling natural vibrations is determined based on the engine rotational speed. Therefore, if the gradient of an increase over time of the engine rotational speed varies with different types of engine starters, e.g., a hybrid vehicle motor and a starter motor, and with different starting torques, as indicated by CONDITION 1 and CONDITION 2 shown in FIG. 6, then the vibration suppressing control process begins at different times, i.e., the beginning timing thereof varies, because of the different types of engine starters.

Figure 6:
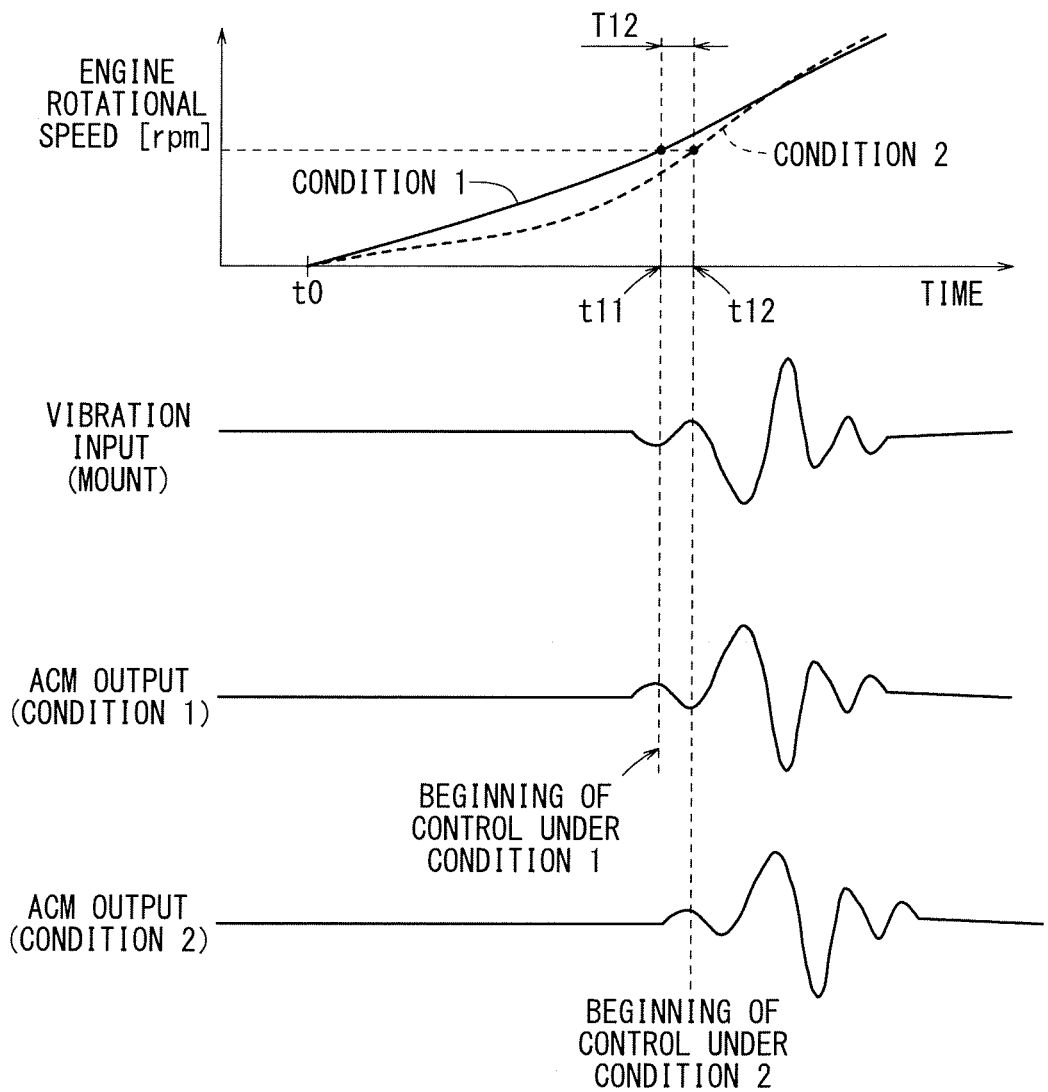
FIG. 6 is a timing chart showing problems of the vibration suppressing control process according to the related art.

More specifically, as shown in FIG. 6, the beginning timing of the vibration suppressing control process occurs at time t11 according to CONDITION 1, whereas the beginning timing of the vibration suppressing control process occurs at time t12 according to CONDITION 2. Thus, the vibration suppressing control process begins at different times, even though the same vibrations are applied to the vehicle body 18.

Consequently, when the vibration suppressing control process begins based on the engine rotational speed, the beginning timing of the vibration suppressing control process, i.e., the time at which the vehicle body 18 begins to vibrate, which is determined based on the engine rotational speed, and the actual time at which rolling natural vibrations are generated, i.e., the actual time at which vibrations are produced on the vehicle body 18 due to rolling natural vibrations, tend to deviate from each other. Therefore, the vibration suppressing control process is likely to be started after the rolling natural vibrations have been generated. As a result, the vibration suppressing control process cannot be carried out in phase with rolling natural vibrations that are generated when the engine is started or restarted. Therefore, according to CONDITION 2 shown in FIG. 6, vibrations caused by rolling natural vibrations and which are transmitted from the engine 14 to the vehicle body 18 cannot be suppressed effectively.

Inasmuch as the CRK pulse signal is a signal having a train of pulses, which are spaced at predetermined angular intervals, the engine rotational speed calculated based on the CRK pulse signal actually changes stepwise at time intervals that depend on the predetermined angular intervals. The engine rotational speed fluctuates over time depending on the way in which the crankshaft rotates. As a consequence, when the engine 14 is started or restarted, the ACMs 16f, 16r begin to be controlled at different times owing to different gradients at which the engine rotational speed increases.

Operations of the Present Embodiment

The crankshaft angle, which is obtained from the pulse count of the CRK pulse signal, represents physical positional information. Therefore, the obtained crankshaft angle is less likely to vary, even if the engine 14 is started by different types of engine starters. The pulse count of the CRK pulse signal tends not to vary even if the vibrations or loads, which are applied from the engine 14 to the ACMs 16f, 16r, change.

Based on the fact that the pulse count of the CRK pulse signal tends not to deviate or vary even if the engine 14 is started by different types of engine starters, the control apparatus 10 according to the present embodiment determines the start time for the vibration suppressing control process for the ACMs 16f, 16r after the engine 14 has been started or restarted, based on the CRK pulse signal, which depends on the rotational position (crankshaft angle) of the crankshaft of the engine 14.

Figure 7:
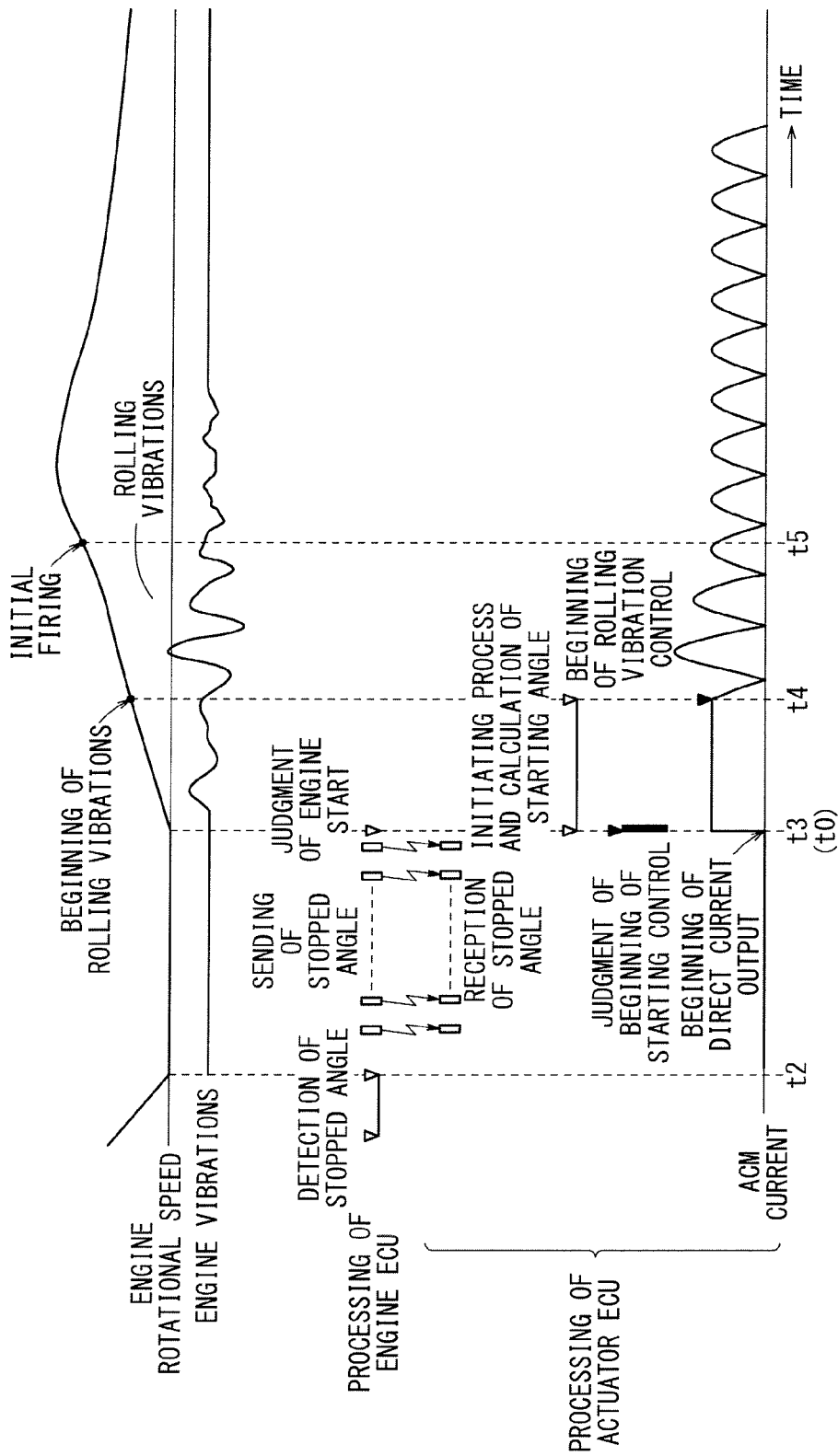
FIG. 7 is a timing chart showing a vibration suppressing control process according to the present embodiment.

Operations of the control apparatus 10 will be described in detail below with reference to FIG. 7.

The engine ECU 24 acquires the CRK pulse signal from the CRK sensor 20.

The stopped position information acquirer 110 continues to detect stopped crankshaft angles until time t2 at which the engine 14 stops operating, and identifies a stopped crankshaft angle at time t2 as a stopped crankshaft angle. The stopped position information acquirer 110 then stores the identified stopped crankshaft angle and information indicating that the engine 14 has stopped operating as stopped position information in the ROM 124. The microcomputer 100 of the engine ECU 24 sends the stopped position information stored in the ROM 124 to the actuator ECU 26 through the CAN communication unit 102 and the CAN communication line 28c. The microcomputer 130 of the actuator ECU 26 receives the stopped position information through the CAN communication line 28c and the CAN communication unit 132, and stores the received stopped position information in the ROM 160.

Even if the engine 14 stops operating, the crankshaft may occasionally rotate after stopping thereof. For this reason, the stopped position information acquirer 110 acquires a stopped crankshaft angle, identifies the stopped crankshaft angle, generates stopped position information, and stores such information in the ROM 124 in each predetermined period while the engine 14 stops operating, i.e., while the engine 14 is in a stopped state. The microcomputer 100 of the engine ECU 24 sends the new stopped position information, which is stored in the ROM 124 in each predetermined period, to the actuator ECU 26 through the CAN communication unit 102 and the CAN communication line 28c.

The microcomputer 130 of the actuator ECU 26 receives the new stopped position information through the CAN communication line 28c and the CAN communication unit 132, and updates the stopped crankshaft angle based thereon. Accordingly, the microcomputer 130 can accurately recognize the latest stopped crankshaft angle.

When the engine 14 is started or restarted at time t3, the start judgment section 112 judges that the engine 14 has been started or restarted, and stores the judgment result as starting judgment information in the ROM 124. The microcomputer 100 of the engine ECU 24 sends the starting judgment information stored in the ROM 124 to the actuator ECU 26 through the CAN communication unit 102 and the CAN communication line 28c. The microcomputer 130 of the actuator ECU 26 receives the starting judgment information through the CAN communication line 28c and the CAN communication unit 132, and stores the received starting judgment information in the ROM 160.

Consequently, based on the starting judgment information stored in the ROM 160, the starting control beginning judgment section 142 of the microcomputer 130 can easily judge whether or not the engine 14 has been started or restarted.

In response to the judgment result from the starting control beginning judgment section 142, the crankshaft angle recognition processor 140 extracts information concerning the time at which the engine 14 is started or restarted from the stopped position information that is stored successively in the ROM 160. The crankshaft angle recognition processor 140 performs an initiation process for identifying the stopped crankshaft angle of the extracted information as a crankshaft angle (starting crankshaft angle) at which the engine 14 is started or restarted. The crankshaft angle recognition processor 140 also calculates a beginning crankshaft angle from the starting crankshaft angle identified by the initiating process, for example, by adding a predetermined number (fixed value) of CRK pulses to the starting crankshaft angle, and stores information concerning the starting crankshaft angle and the beginning crankshaft angle in the ROM 160.

In response to the judgment result from the starting control beginning judgment section 142, the drive current calculator 144 generates a command current waveform. The drive controllers 146f, 146r generate drive signals having PWM duty ratios depending on the command current waveform, and then supply the generated drive signals to the drive circuits 134f, 134r. The drive circuits 134f, 134r generate drive currents based on the drive signals, and supply the generated drive currents to the respective coils 80 of the ACMs 16f, 16r. At this time, the coils 80 of the ACMs 16f, 16r are energized to move the movable members 66, the rods 82, and the movable cores 84 to respective predetermined positions.

Subsequently, at time t4, the engine 14 starts to produce rolling natural vibrations, whereupon loads that depend on the rolling natural vibrations are applied to the ACMs 16f, 16r, thereby transmitting vibrations to the vehicle body 18.

Since time t4 represents a time depending on the beginning crankshaft angle, the drive current calculator 144 generates a command current waveform for suppressing vibrations of the vehicle body 18, and the drive controllers 146f, 146r generate drive signals depending on the command current waveform, and then supply the generated drive signals to the drive circuits 134f, 134r. The drive circuits 134f, 134r generate drive currents based on the drive signals, and supply the generated drive currents to the respective coils 80 of the ACMs 16f, 16r.

The coils 80 are energized to move the movable members 66 quickly from the predetermined positions to positions that depend on the drive currents. In this manner, the vibrations applied to the vehicle body 18 are suppressed effectively.

Time t5 represents a time at which the engine 14 is fired for the first time. The control apparatus 10 performs the vibration suppressing control process as a countermeasure to the rolling natural vibrations within the time zone from time t4 to time t5. After time t5, the control apparatus 10 performs a control process for suppressing transmission of vibrations from the engine 14 to the vehicle body 18.

According to the present embodiment, therefore, before the engine 14 produces rolling natural vibrations, a crankshaft angle at which the rolling natural vibrations are produced is recognized as a beginning crankshaft angle. Therefore, the time at which vibrations will be produced in the vehicle body 18 is grasped accurately. The time at which the vibration suppressing control process begins does not vary with different types of engine starters. Since the vibration suppressing control process begins in timed relation to the recognized beginning crankshaft angle, the vibration suppressing control process is performed efficiently. Further, since the crankshaft angle does not vary depending on the rolling natural vibrations of the engine 14, the vibration suppressing control process is performed stably in order to suppress vibrations of the vehicle body 18, i.e., loads applied to the vehicle body 18.

Figure 8:
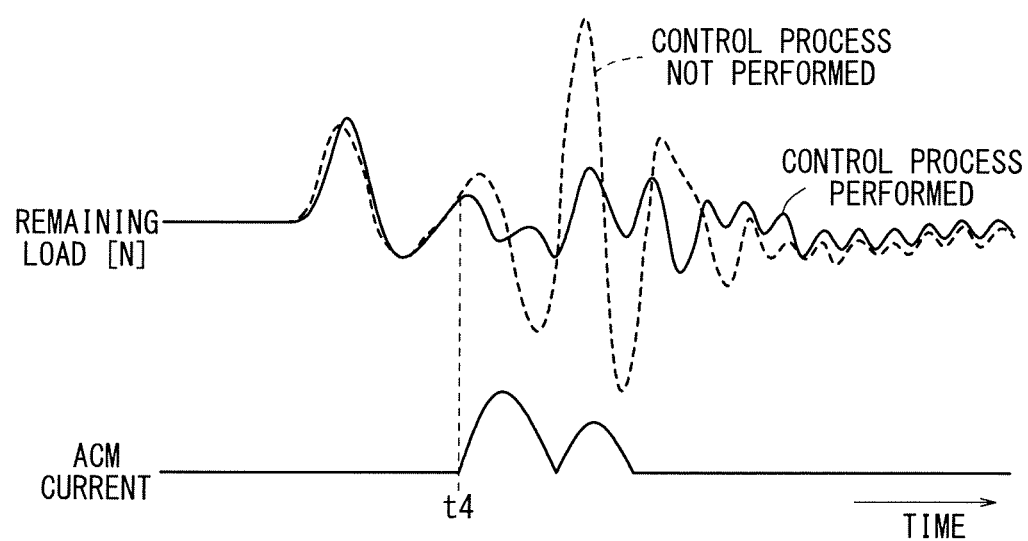
FIG. 8 is a timing chart showing an event that takes place when the vibration suppressing control process according to the present embodiment is performed, and an event that takes place when the vibration suppressing control process according to the present embodiment is not performed.

FIG. 8 shows an event that takes place when the vibration suppressing control process according to the present embodiment is performed, and an event that takes place when the vibration suppressing control process according to the present embodiment is not performed. As can readily be seen from FIG. 8, when the vibration suppressing control process according to the present embodiment is performed, loads applied to the vehicle body 18 are reduced, and hence, vibrations of the vehicle body 18 are suppressed. The current supplied to each of the ACMs 16f, 16r, i.e., the ACM current, which is shown in FIG. 8, represents a current that is supplied only for the purpose of suppressing rolling natural vibrations.

Advantages of the Present Embodiment

With the control apparatus 10 according to the present embodiment, as described above, the actuator ECU 26 begins the vibration suppressing control process using the ACMs 16f, 16r when the crankshaft angle reaches the beginning crankshaft angle at the time that the engine 14 is started or restarted.

Since the rotational position of the crankshaft, i.e., the crankshaft angle, represents physical positional information, the crankshaft angle is less likely to vary, even if the engine 14 is started by different types of engine starters. The crankshaft angle also is less liable to deviate from the time at which the engine 14 produces rolling natural vibrations (rolling resonance).

According to the present embodiment, the vibration suppressing control process is performed based on the crankshaft angle, rather than being based on engine rotational speed, which has been the basis for the vibration suppressing control process according to the related art. Consequently, the timing accuracy of the vibration suppressing control process is increased. More specifically, since the vibration suppressing control process is performed based on the crankshaft angle, which represents physical positional information, even though the gradient of an increase over time of the engine rotational speed varies with different types of engine starters, the timing of the vibration suppressing control process is prevented from varying.

According to the present embodiment, since the vibration suppressing control process for suppressing vibrations of the vehicle body 18 is carried out in a timely fashion based on the crankshaft angle, vibrations of the vehicle body 18 are suppressed effectively.

The beginning crankshaft angle preferably is a crankshaft angle at which rolling natural vibrations are produced, for example. If the vibration suppressing control process begins from the crankshaft angle at which rolling natural vibrations are produced, it is possible to efficiently suppress vibrations that are caused by rolling natural vibrations and which are transmitted from the engine 14 to the vehicle body 18.

According to the present embodiment, since the vibration suppressing control process may begin prior to the crankshaft angle at which rolling natural vibrations are produced, any desired crankshaft angle between the starting crankshaft angle and the crankshaft angle at which rolling natural vibrations are produced may be established as a beginning crankshaft angle, and the vibration suppressing control process may begin from the beginning crankshaft angle.

According to the present embodiment, a beginning crankshaft angle is established based on the crankshaft angle while the engine 14 is in a stopped state (stopped crankshaft angle). More specifically, if the engine 14 stops operating at different crankshaft angles, rolling natural vibrations are produced at different times when the engine 14 is started or restarted. According to the present embodiment, since the beginning crankshaft angle is established based on the stopped crankshaft angle, the timing accuracy of the vibration suppressing control process is increased regardless of different crankshaft angles at which the engine 14 stops operating.

When the engine 14 is started or restarted, the actuator ECU 26 supplies direct currents to the ACMs 16*f*, 16*r* so that the movable members 66, etc., are moved to respective predetermined positions. When the beginning crankshaft angle is reached, the actuator ECU 26 supplies currents to the ACMs 16*f*, 16*r* depending on the rolling natural vibrations of the engine 14, thereby initiating the vibration suppressing control process.

Using reaction forces generated under the elasticity of the second elastic bodies 64 with the movable members 66 embedded therein, the ACMs 16*f*, 16*r* are capable of producing desired forces from the drive currents supplied in an initial phase of operation of the ACMs 16*f*, 16*r*. As a result, the vibration suppressing control process is performed effectively from the initial phase of operation of the ACMs 16*f*, 16*r*.

Even during times that the engine 14 stops operating, the stopped position information acquirer 110 acquires a stopped crankshaft angle in each predetermined period, and stores stopped position information including the stopped crankshaft angle in the ROM 124. The stopped position information stored in the ROM 124 is sent from the engine ECU 24 to the actuator ECU 26 through the CAN communication line 28*c*. Accordingly, even if the crankshaft rotates while the engine 14 is in a stopped state, the stopped crankshaft angle immediately before the engine 14 is started or restarted can accurately be grasped, so that the timing accuracy of the vibration suppressing control process is increased.

The stopped position information correctors 114, 150 correct the crankshaft angle while the engine 14 is in the stopped state (stopped crankshaft angle), or more specifically, a stopped crankshaft angle (starting crankshaft angle) at the time the engine 14 is started or restarted, based on the TDC positions of the pistons in the cylinders of the engine 14.

Even if the starting crankshaft angle varies slightly, the stopped position information correctors 114, 150 are capable of correcting such a variation based on the TDC position, so as to acquire an accurate crankshaft angle. Consequently, the timing of the vibration suppressing control process is established accurately when the engine 14 is started or restarted.

Modifications of the Present Embodiment

Figure 9:
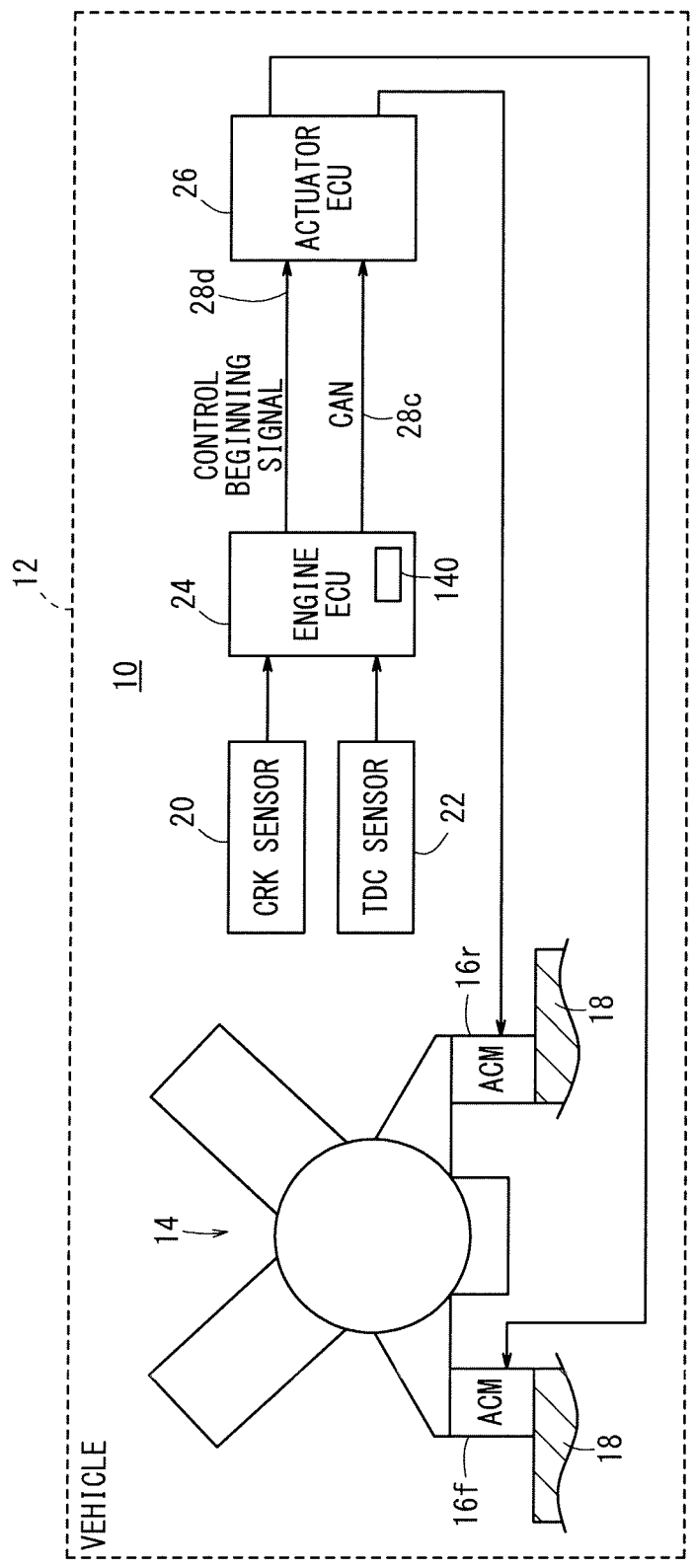
FIG. 9 is a schematic view, partially in block form, of a modification of the embodiment of the present invention.

According to the modification shown in FIG. 9, the control apparatus 10 includes the crankshaft angle recognition processor 140 included in the engine ECU 24.

The CRK pulse signal line 28*a* for supplying the CRK pulse signal and the TDC pulse signal line 28*b* for supplying the TDC pulse signal are dispensed with. A control signal line 28*d* for supplying a control start signal representing a beginning crankshaft angle identified by the crankshaft angle recognition processor 140 is connected between the engine ECU 24 and the actuator ECU 26.

Other details of the control apparatus 10 according to the modification shown in FIG. 9 are substantially the same as those of the control apparatus 10 shown in FIG. 1.

Figure 10:
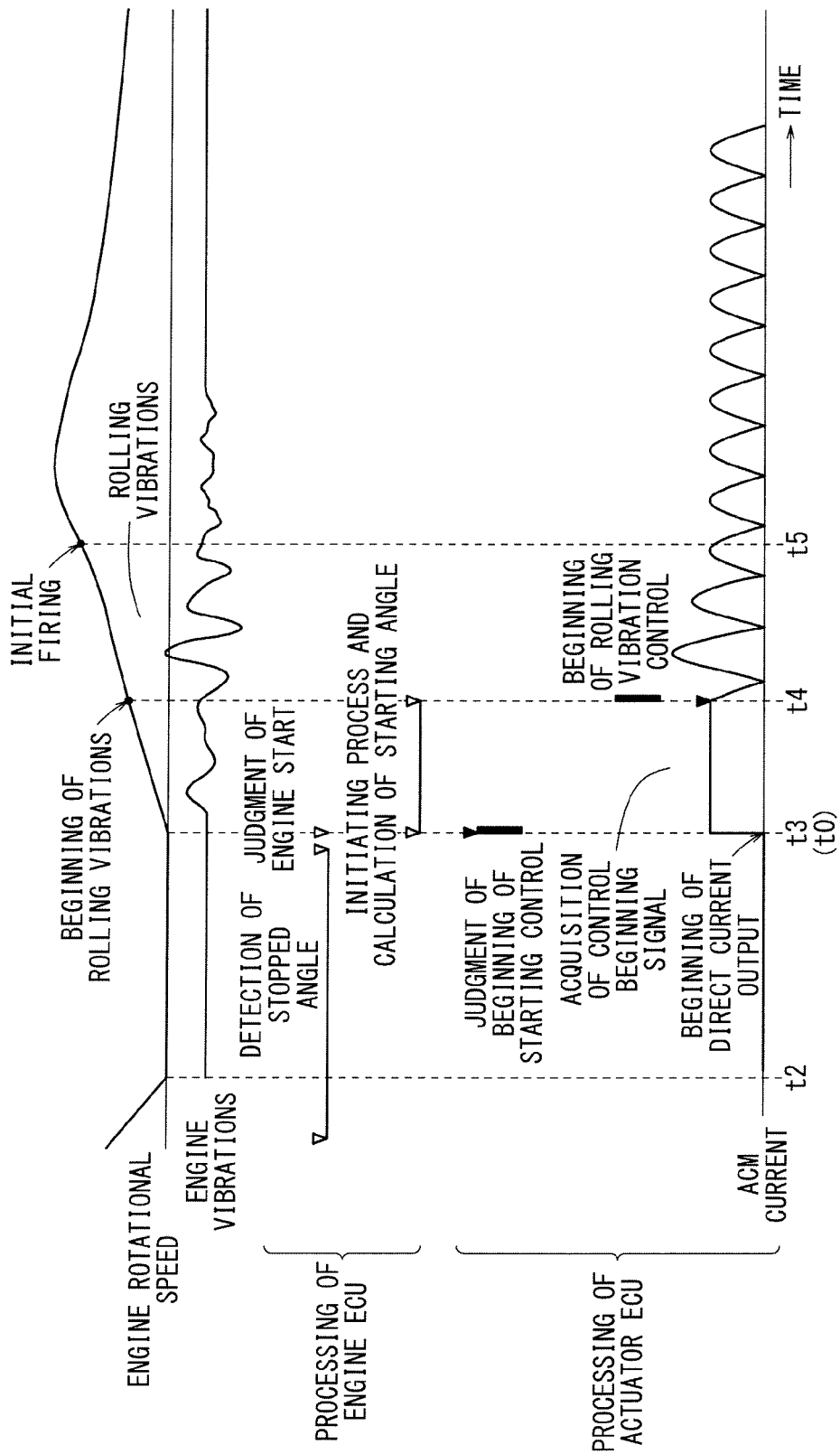
FIG. 10 is a timing chart showing a vibration suppressing control process according to the modification shown in FIG. 9.

As shown in FIG. 10, the initiating process for recognizing a crankshaft angle at the time that the engine 14 is started or restarted, and the process for calculating a beginning crankshaft angle are performed by the engine ECU 24, which includes the crankshaft angle recognition processor 140. A control start signal representing a beginning crankshaft angle is sent from the engine ECU 24 to the actuator ECU 26 through the control signal line 28*d*. Therefore, based on the received control start signal, the vibration control beginning judgment section 148 of the actuator ECU 26 can easily recognize that the vibration suppressing control process may be performed from the beginning crankshaft angle.

The modification shown in FIG. 9 offers the same various advantages of the aforementioned vibration suppressing control process described above.

A case has been described above in which the vibration suppressing control process is performed on the basis of the crankshaft angle.

However, the present invention is not limited to the above description. The vibration suppressing control process may alternatively be performed on the basis of the position of a piston of the engine 14, i.e., based on the TDC pulse signal that is supplied from the TDC sensor 22. More specifically, when the position of a piston based on the TDC pulse signal reaches a piston position at which rolling natural vibrations are produced at the time that the engine 14 is started or restarted, for example, the actuator ECU 26 begins the vibration suppressing control process using the ACMs 16*f*, 16*r*, for thereby effectively suppressing vibrations caused by the rolling natural vibrations and which are transmitted from the engine 14 to the vehicle body 18.

More specifically, similar to the rotational position of the crankshaft (crankshaft angle), the position of the piston represents physical positional information. Even though the gradient of an increase over time of the engine rotational speed varies with different types of engine starters, based on the position of the piston, which is representative of physical positional information, the timing of the vibration suppressing control process is prevented from varying, regardless of different types of engine starters that are used when the vibration suppressing control process is performed. Thus, since the vibration suppressing control process is less liable to deviate in timing from the rolling natural vibrations, the timing accuracy of the vibration suppressing control process is increased compared with the timing accuracy of the conventional vibration suppressing control process, which is performed based on engine rotational speed.

When the crankshaft undergoes one revolution, the piston moves back and forth in one cycle. Therefore, during one revolution of the crankshaft, the piston reaches the same single position twice. For performing the vibration suppressing control process reliably, therefore, it is necessary to detect the TDC position with the TDC pulse signal, and to judge whether the piston moves from the TDC position to the bottom dead center (BDC) position, or from the BDC position to the TDC position, for thereby accurately judging the position of the piston.

In the above description of FIGS. 1 through 4, the terms "stopped crankshaft angle" and "starting crankshaft angle" used in the process concerning the crankshaft angle may be replaced respectively with the position of a piston in the stopped state of the engine 14 and the position of a piston at the beginning time of the vibration suppressing control process, so that the vibration suppressing control process described above may be read as a vibration suppressing control process based on the TDC pulse signal.

Although a preferred embodiment of the present invention has been described in detail above, it should be understood that the present invention is not limited to the illustrated embodiment, and various changes and modifications may be made to the embodiment without departing from the scope of the invention as set forth in the appended claims.

What is claimed is:

1. A control apparatus for controlling an active vibroisolating support device, which is mounted on a vehicle body and supports an engine, and which suppresses vibrations transmitted from the engine to the vehicle body by energizing an actuator, comprising:
a crankshaft rotational position acquiring unit configured to acquire a rotational position of a crankshaft that is rotatable in the engine; and
a control unit configured to energize the actuator to start a vibration suppressing control process of suppressing vibrations transmitted from the engine to the vehicle body,
wherein the crankshaft rotational position acquiring unit acquires the rotational position of the crankshaft as a crankshaft angle based on physical positional information obtained from a count value of a train of pulses of a crankshaft pulse signal, and
wherein at a time that the engine is started or restarted, the control unit is configured to:
set a specific crankshaft angle corresponding to a specific count value of the train of pulses of the crankshaft pulse signal, as a beginning crankshaft angle, at which the actuator starts the vibration suppressing control process; and
energize the actuator to start the vibration suppressing control process at a timing at which the rotational position of the crankshaft, which is acquired by the crankshaft rotational position acquiring unit, reaches the beginning crankshaft angle.

2. The control apparatus according to claim 1, wherein the control unit acquires a rotational position of the crankshaft from the crankshaft rotational position acquiring unit in a stopped state of the engine, and establishes the predetermined rotational position based on the acquired rotational position of the crankshaft in the stopped state of the engine.

3. The control apparatus according to claim 1, wherein the actuator is periodically expanded and contracted based on a current supplied from the control unit depending on a state of the engine, for thereby vibrating a vibrating plate fixed to the actuator in order to suppress the vibrations transmitted from the engine to the vehicle body;
the control unit supplies a predetermined direct current to the actuator, so as to move the vibrating plate to a predetermined position when the engine is started or restarted; and
the control unit supplies the current depending on the state of the engine to the actuator, so as to enable the actuator to start the vibration suppressing control process when the rotational position of the crankshaft reaches the predetermined rotational position.

4. The control apparatus according to claim 1, further comprising:
a memory unit configured to store the rotational position of the crankshaft acquired by the crankshaft rotational position acquiring unit,
wherein the control unit acquires the rotational position of the crankshaft from the memory unit and updates the acquired rotational position of the crankshaft during a period after the engine has stopped operating until the engine is started or restarted.

5. The control apparatus according to claim 1, further comprising:
a top-dead-center detecting unit configured to detect positional information of a piston disposed in the engine with respect to a top dead center position thereof,
wherein the control unit acquires a rotational position of the crankshaft in a stopped state of the engine from the crankshaft rotational position acquiring unit, and corrects information of the acquired rotational position of the crankshaft in the stopped state of the engine based on the positional information of the piston, which is detected by the top-dead-center detecting unit.

6. A control apparatus for controlling an active vibroisolating support device, which is mounted on a vehicle body and supports an engine, and which suppresses vibrations transmitted from the engine to the vehicle body by energizing an actuator, comprising:
a piston position acquiring unit configured to acquire a position of a piston disposed in the engine; and
a control unit configured to energize the actuator to start a vibration suppressing control process of suppressing vibrations transmitted from the engine to the vehicle body,
wherein the piston position acquiring unit acquires the position of the piston based on physical positional information obtained from a count value of a train of pulses, and
wherein at a time that the engine is started or restarted, the control unit is configured to:
set a specific piston position corresponding to a specific count value of the train of pulses, as a beginning piston position, at which the actuator starts the vibration suppressing control process; and
energize the actuator to start the vibration suppressing control process at a timing at which the position of the piston, which is acquired by the piston position acquiring unit, reaches the beginning piston position.

7. The control apparatus according to claim 6, further comprising:
a top-dead-center detecting unit configured to detect positional information of the piston with respect to a top dead center position thereof,
wherein the control unit judges whether the piston moves from the top dead center position to a bottom dead center position, or from the bottom dead center position to the top dead center position, based on the positional information of the piston, which is acquired by the top-dead-center detecting unit.

* * * * *